United States Patent [19]

Hagel et al.

[11] Patent Number: 5,571,988
[45] Date of Patent: Nov. 5, 1996

[54] GAS-PRODUCING MATERIAL

[75] Inventors: Rainer Hagel, Erlangen; Uwe Brede, Furth, both of Germany

[73] Assignee: Dynamit Nobel AG, Troisdorf, Germany

[21] Appl. No.: 417,835

[22] Filed: Apr. 6, 1995

Related U.S. Application Data

[63] Continuation of Ser. No. 967,392, Oct. 28, 1992, abandoned.

[30]      Foreign Application Priority Data

Oct. 30, 1991 [DE] Germany ............... 41 35 776.0

[51] Int. Cl.$^6$ ............... C06B 47/00; C10L 1/30; B60R 21/28
[52] U.S. Cl. ............... 149/1; 149/74; 44/458; 280/741; 252/186.44
[58] Field of Search ............... 252/372, 374, 252/186.44, 186.1; 149/1, 74; 44/457, 458; 60/217; 280/741

[56]          References Cited

U.S. PATENT DOCUMENTS

| | | | |
|---|---|---|---|
| 3,273,348 | 9/1966 | Hart | 62/49 |
| 4,679,706 | 7/1987 | Magid et al. | 222/130 |
| 4,902,539 | 2/1990 | Jackson | 252/372 |
| 5,330,730 | 7/1994 | Brede et al. | 422/309 |
| 5,415,845 | 5/1995 | Brede et al. | |
| 5,441,302 | 8/1995 | Johnson et al. | |
| 5,470,104 | 10/1995 | Smith et al. | |
| 5,494,312 | 2/1996 | Rink | |

FOREIGN PATENT DOCUMENTS 0540013  5/1993  European Pat. Off. .

OTHER PUBLICATIONS

B. Kit, et al. "Rocket Propellant Handbook" 1960; pp. 164–167 and pp. 344–346.

Chemical Abstract #124:150123, "Gas Generator for Airbags", by Martin Specht, taken from EP Patent No. 95–103518, Mar. 10, 1995.

*Primary Examiner*—Sharon Gibson
*Assistant Examiner*—Joseph D. Anthony
*Attorney, Agent, or Firm*—Antonelli, Terry, Stout & Kraus

[57]              ABSTRACT

A gas-producing material for a gas generator, particularly, for an inflatable impact cushion for protecting motor vehicle passengers is made up of a combustible liquid gas mixture of one or several short-chain hydrocarbons and nitrogen monoxide. As a result of exothermic action during combustion there is a multifold increase in volume so that no filters which are required for solid matter generators, are necessary.

14 Claims, No Drawings

GAS-PRODUCING MATERIAL

This application is a continuation application of application Ser. No. 967,392, filed Oct. 28, 1992, now abandoned.

BACKGROUND OF THE INVENTION

The invention relates to a gas-producing material for a gas generator, particularly for an inflatable impact cushion for protecting the passenger in a motor vehicle from injury, which consists of a combustible liquid gas mixture.

With the gas generators used at present for inflatable impact cushions (also called "airbags") a filter charge composition in tablet or disc form is used as a combustible gas-producing material. On ignition, this charge composition generates the useful gas or pressure gas for inflating the impact cushion. A disadvantage of the combustion of such solid gas-producing materials is seen in the quite high amount of slag formation during combustion, representing more than 50% of the mass of the charge composition used. Because of the slag and dust formation during combustion, expensive filter stages in the gas generator are necessary in order to hold back slag and dust particles. Otherwise, when these particles emerge, the impact cushion would be damaged and the passengers placed in danger.

As an alternative to generators containing solid materials there are generators containing compressed gases or air. In order to form a sufficient volume of gas, very high charge pressures are necessary as cooling takes place on discharge of the gases and no increase in volume can be achieved by exothermic reactions such as with solid gas-producing materials.

SUMMARY OF THE INVENTION

A basic object of the present invention as to provide a gas-producing material for a gas generator, particularly for use with an inflatable impact cushion for protecting a motor vehicle passenger from injury, in which slag retaining devices are not necessary. Moreover, liquified gas is to be used as a gas-producing material, which, on ignition burns in a combustion chamber in a controlled manner.

A solution of the afore-mentioned object is seen in a liquid gas mixture as gas-producing material wherein the liquid gas is a material which, under normal conditions (room temperature and normal pressure) is present in the gaseous physical state and is liquid because of the pressure under which it exists in the storage chamber. This liquid gas under pressure is injected in a controlled manner into the combustion chamber in a housing adjacent to the storage chamber. Shortly before or when the liquid gas is admitted into the combustion chamber, an ignition device is actuated. As an ignition device, one can use, for example, an electrically actuated incandescent wire, an explodable wire, a hot, particle-rich flame, an impact detonator or the like device containing an ignition charge capable of igniting the combustible mixture. The ignition vapors and hot combustion gases of an ignition charge ignite the liquid gas which evaporates or volatilizes because of the expansion occurring in the combustion chamber without leaving solid particles behind. The provision of filter stages in front of at least one outlet opening of a gas generator housing wall can therefore be dispensed with in using the gas-producing material according to the invention. If filter stages are provided, these serve exclusively for the purpose of cooling. The cooling can, however, also occur in another manner, by connecting to a distributor chamber of the housing to the combustion chamber, the combustion gases reaching the exterior from the distributor chamber via at least one outlet opening.

Advantageously, the gas producing material consists of a liquid gas mixture comprising one or several short-chain hydrocarbons and nitrogen monoxide ($NO_2$).

In accordance with the invention therefore gas mixtures are proposed having a low charge pressure, which mixtures, as a result of exothermic action, produce on combustion a multifold increase in volume and do not require any filters. In order to avoid high charge pressures, oxygen or air is dispensed with, i.e. is avoided, as an oxidizing agent. In using nitrogen monoxide (laughing gas) a gas is provided which is easily liquified (critical pressure: 72.7 bar, critical temperature: 36.4° C.). The capacity for oxidation with nitrogen monoxide is double that of air and, in contrast to pure oxygen or air, laughing gas behaves as an inert gas up to at least 200° C., as a result of which quiescent oxidizing processes are prevented from occurring even with storage at relatively high temperatures.

Preferred hydrocarbons for the purpose of the present invention are hydrocarbons selected from the group consisting of propane, n-butane and i-butane as well as mixtures thereof. A particularly preferred hydrocarbon for the purpose of the present invention is industrial butane, which consists of a mixture of n-butane and i-butane (isobutane).

The ignitibility of nitrogen monoxide-hydrocarbon mixtures is obtained within a wide range. For example mixtures of 97.5% by weight nitrogen monoxide and 2.5% by weight butane (n-, i- or a mixture thereof) up to 70% by weight nitrogen monoxide and 30% by weight butane are exceptionally good at igniting. The thermal stability of nitrogen monoxide-butane mixtures satisfies all requirements which are made in the automobile field. In ignition tests with an incandescent wire the reaction of the mixtures does not occur before reaching a wire temperature of more than 500° C.

The weight ratio of hydrocarbon to nitrogen monoxide is preferably adjusted to be such that the inflated impact cushion contains a non-combustible gas mixture. Correspondingly the weight ratio of hydrocarbon to nitrogen monoxide should be adapted to the stoichiometric ratios for a complete (as far as possible) combustion of the hydrocarbon. Advantageously therefore nitrogen monoxide is used in a slight excess relative to the hydrocarbon. The reaction products then consist substantially of gaseous substances ($CO_2$, $H_2O$ and $N_2$) in addition to residual components of hydrocarbon and/or nitrogen monoxide which, if the case arises, are present, for example when using propane or butane and laughing gas. A particularly suitable mixing ratio for the components butane and nitrogen monoxide is a weight ratio of butane to nitrogen monoxide of 5:95 parts by weight. Nitrogen monoxide functions here as an oxygen generator.

For special applications, where it should be necessary to deviate from the stoichiometric ratio, a catalytic secondary reaction may be appropriate in order to reduce proportions of gas which are detrimental to health; for example by use of a catalyst formed of a suitable material in the form of throughflow screen.

The speed of reaction, particularly with higher charge masses in liquid gas generators can be controlled surprisingly within wide limits by adding inert gases, particularly physiologically harmless gases with a low characteristic pressure. It is therefore particularly preferable to select the inert gas from carbon dioxide and/or xenon. The inert gases named can, for example, be used in a quantity of 10 to 80% by weight relative to the mixture of hydrocarbon, as used herein (the term "hydrocarbon" includes propane, n-butane and i-butane, as well as mixture thereof) and nitrogen monoxide. Carbon dioxide, as is known, can be condensed as easily as nitrogen monoxide (critical pressure: 73.8 bar, critical temperature: 31.0° C). The inert gas, particularly carbon dioxide acts for the purpose of the present invention as a reaction moderator. Carbon dioxide has significantly more favorable properties than, for example, nitrogen or other inert gases, the application of which should however not be ruled out.

According to the invention the liquid gas mixture can be composed of 14 to 97.5% by weight of nitrogen monoxide, 0.5 to 27% by weight hydrocarbon and up to 80% by weight of the inert gas; the percentages by weight of these components being equal to 100% by weight of the liquid gas to be used in a gas generator. In detail, for example, the following compositions can be used:

| Composition I: | |
| --- | --- |
| Nitrogen monoxide | 90% by weight |
| Hydrocarbon | 10% by weight |
| Composition II: | |
| Nitrogen monoxide | 70% by weight |
| Hydrocarbon | 30% by weight |
| Composition III: | |
| Nitrogen monoxide | 97.5% by weight |
| Hydrocarbon | 2.5% by weight |
| Composition IV: | |
| Nitrogen monoxide | 14% by weight |
| Hydrocarbon | 6% by weight |
| Inert gas | 80% by weight |
| Composition V: | |
| Nitrogen monoxide | 59.4% by weight |
| Hydrocarbon | 6.6% by weight |
| Inert gas | 34% by weight |
| Composition VI: | |
| Nitrogen monoxide | 19.5% by weight |
| Hydrocarbon | 0.5% by weight |
| Inert gas | 80% by weight |
| Composition VII: | |
| Nitrogen monoxide | 87.75% by weight |
| Hydrocarbon | 2.25% by weight |
| Inert gas | 10% by weight |
| Composition VIII: | |
| Nitrogen monoxide | 63% by weight |
| Hydrocarbon | 27% by weight |
| Inert gas | 10% by weight |

The explosion temperature of the mixtures according to the invention is approximately 3000° C.; an exponential increase in the volume therefore occurs with the reaction. The adaption of the kinetics to the respective airbag-system can be adjusted by varying the quantity of the reaction moderator, in particular the quantity of carbon dioxide.

The following examples demonstrate the usefulness of the compositions according to the invention.

EXAMPLE 1

2.5 g of a mixture of 90% by weight nitrogen monoxide and 10% by weight butane (industrial) are condensed in a commercially available nitrogen monoxide cartridge with 10 ml contents, suitable for example, for a cream dispenser, once the nitrogen monoxide has been discharged. This mixture was ignited by an ignition-charge, for example with an explodable wire. As a condition of the high explosion temperature, an exponential increase in the volume occurs. The gas which is generated can be used for example to inflate an impact cushion.

EXAMPLE 2

This example demonstrates the stability of the mixtures according to the invention. A commercially available No. 8 detonating cap, which is attached to a cartridge filled according to Example 1, perforated the cartridge and the cartridge was disintegrated into small parts.

A filling of purely nitrogen monoxide did not dissociate when the detonating cap ignited. If a layer of commercially available insulating tape was laid around the cartridge and the detonating cap was then mounted on the tape, the cartridge wall was only pressed in strongly, but not perforated, and the gas mixture did not ignite. It therefore survived even the detonation impact of a detonating cap.

EXAMPLE 3

A mixture of 66% by weight nitrogen monoxide/butane (industrial) in the ratio of 90 parts by weight nitrogen monoxide to 10 parts by weight butane (59.4% by weight nitrogen monoxide and 6.6% by weight butane) and 34% by weight carbon dioxide with a charging density of 0.5 g/ml at 70° C. gave a pressure of 110 bar and a pressure of 180 bar at the maximum required temperature of 110° C. This mixture was ignited by an ignition charge, for example with an explodable wire. As a condition of the high explosion temperature, an exponential increase in the volume occurs. The mixture fulfills on ignition the required pressure-time-curve for airbag generators. When igniting a cartridge with 2.5 g charge mass using a No. 8 detonating cap, the cartridge did not disintegrate into fragments.

We claim:

1. A gas-producing material for a gas generator, for use with an air bag of a vehicle, said gas-producing material consists of a liquefied gas mixture, wherein the components making up the liquefied gas mixture comprise 0.5 to 27% by weight of at least one hydrocarbon selected from the group consisting of propane, n-butane, and isobutane, 14 to 97.5% by weight of nitrogen monoxide, and up to 80% by weight of an inert gas.

2. A gas-producing material according to claim 1, wherein the liquified gas mixture consists of 14 to 97.5% by weight of the nitrogen monoxide, 0.5 to 27% by weight of the at least one hydrocarbon and up to 80% by weight of an inert gas selected from the group consisting of $CO_2$, xenon, $N_2$ and mixtures thereof.

3. A gas-producing material according to claim 1, wherein the liquified gas mixture consists of the at least one hydrocarbon, nitrogen monoxide, and an inert gas selected from the group consisting of $CO_2$, xenon, $N_2$ and mixtures thereof.

4. A gas-producing material according to claim 3, wherein the inert gas is at least one of carbon dioxide and xenon and the inert gas is present in a quantity of 10 to 80% by weight, relative to the total mixture of the at least one hydrocarbon, nitrogen monoxide and the inert gas.

5. A gas-producing material according to claim 1, wherein the hydrocarbon is industrial butane.

6. A gas-producing material according to any one of claims 1 and 5, wherein the content of nitrogen monoxide is in the range of 70 to 97.5% by weight, relative to the total weight of the mixture of the at least one hydrocarbon and the nitrogen monoxide.

7. A gas-producing material according to any one of claims 1 and 5, wherein the weight ratio of the at least one hydrocarbon to nitrogen monoxide is set to correspond to the stoichiometric ratios for a complete combustion of the at least one hydrocarbon.

8. A gas-producing material according to any one of claims 1 and 5, wherein the weight ratio of butane to nitrogen monoxide is 5:95 parts by weight.

9. A gas-producing material according to any one of claims 1 and 5, wherein the liquified gas mixture contains, besides the at least one hydrocarbon and nitrogen monoxide, an inert gas selected from the group consisting of $CO_2$, xenon, $N_2$ and mixtures thereof.

10. A gas-producing material according to claim 9, wherein the inert gas is at least one of carbon dioxide and xenon, and the inert gas is present in a quantity of 10 to 80% by weight, relative to the total mixture of the at least one hydrocarbon, nitrogen monoxide and the inert gas.

11. A gas-producing material according to any one of the claims 1 and 5, wherein said liquefied gas mixture consists of said at least one hydrocarbon, said nitrogen monoxide, and optionally said inert gas.

12. A gas-producing material according to claim 11, wherein the content of nitrogen monoxide is in the range of 70 to 97.5% by weight relative to the total weight of the mixture of the at least one hydrocarbon and the nitrogen monoxide.

13. A gas-producing material according to claim 11, wherein the weight ratio of the at least one hydrocarbon to nitrogen monoxide is set to correspond to the stoichiometric ratios for a complete combustion of the at least one hydrocarbon.

14. A gas-producing material according to claim 11, wherein the weight ratio of butane to nitrogen monoxide is 5:95 parts by weight.

* * * * *